US012734607B2

(12) United States Patent
Jiang et al.

(10) Patent No.: US 12,734,607 B2
(45) Date of Patent: Sep. 15, 2026

(54) LENS ASSEMBLY AND LASER WELDING HEAD

(71) Applicant: GANGCHUN LASER TECHNOLOGY (JIANGSU) CO., LTD, Jiangsu (CN)

(72) Inventors: Xiuqing Jiang, Jiangsu (CN); Xiaojie Zhu, Jiangsu (CN)

(73) Assignee: Gangchun Laser Technology (Jiangsu) Co., Ltd., Jiangsu (CN)

(*) Notice: Subject to any disclaimer, the term of this patent is extended or adjusted under 35 U.S.C. 154(b) by 706 days.

(21) Appl. No.: 18/027,138

(22) PCT Filed: Jun. 27, 2022

(86) PCT No.: PCT/CN2022/101559

§ 371 (c)(1),
(2) Date: Mar. 20, 2023

(87) PCT Pub. No.: WO2023/284538

PCT Pub. Date: Jan. 19, 2023

(65) Prior Publication Data

US 2023/0330771 A1 Oct. 19, 2023

(30) Foreign Application Priority Data

Jul. 13, 2021 (CN) ........................ 202110787323.X

(51) Int. Cl.
*B23K 26/064* (2014.01)
*B23K 26/046* (2014.01)
(Continued)

(52) U.S. Cl.
CPC ........ *B23K 26/0648* (2013.01); *B23K 26/046* (2013.01); *B23K 26/144* (2015.10);
(Continued)

(58) Field of Classification Search
CPC .............. B23K 26/046; B23K 26/1476; B23K 26/0648; B23K 26/707
See application file for complete search history.

(56) References Cited

U.S. PATENT DOCUMENTS

2013/0315275 A1 11/2013 Iwase

FOREIGN PATENT DOCUMENTS

CN 101134266 A * 3/2008
CN 103056512 A 4/2013
(Continued)

OTHER PUBLICATIONS

Office Action issued to Chinese counterpart application 202110787323.X dated Aug. 16, 2021.
International Search Report issued to counterpart application PCT/CN2022/101559 dated Sep. 21, 2022.

*Primary Examiner* — Thien S Tran
(74) *Attorney, Agent, or Firm* — McNees Wallace & Nurick LLC

(57) ABSTRACT

Provided is a lens assembly. The lens assembly includes a first optical path offset assembly (33), a second optical path offset assembly (34), a drive mechanism, an elastic seal ring (35) and a locking mechanism (37). The optical path of the first optical path offset assembly and the optical path of the second optical path offset assembly communicate with each other. The first optical path offset assembly and the second optical path offset assembly are each rotatable about the central axis of the lens assembly (3). The drive mechanism is configured to drive the first optical path offset assembly to rotate about the central axis. The elastic seal ring is configured to make the first optical path offset assembly and the second optical path offset assembly rotate together. The locking mechanism is pressed against the first optical path offset assembly or the second optical path offset assembly to enable the first optical path offset assembly and the second
(Continued)

optical path offset assembly to rotate relative to each other. The lens assembly enables an offset laser beam to be further offset or be rectified, and thereby the size of a light spot can be regulated in a more diversified manner and with a higher precision. Also provided is a laser welding head. The laser welding head includes the preceding lens assembly.

14 Claims, 9 Drawing Sheets

(51) Int. Cl.

| | |
|---|---|
| ***B23K 26/14*** | (2014.01) |
| ***B23K 26/144*** | (2014.01) |
| ***B23K 26/21*** | (2014.01) |
| ***B23K 26/70*** | (2014.01) |

(52) U.S. Cl.

CPC .......... *B23K 26/1464* (2013.01); *B23K 26/21* (2015.10); *B23K 26/707* (2015.10)

(56) References Cited

FOREIGN PATENT DOCUMENTS

| | | | | | |
|---|---|---|---|---|---|
| CN | 105081561 | A | | 11/2015 | |
| CN | 204934884 | U | | 1/2016 | |
| CN | 207796034 | U | * | 8/2018 | |
| CN | 208455063 | U | | 2/2019 | |
| CN | 208649468 | U | | 3/2019 | |
| CN | 109834386 | A | | 6/2019 | |
| CN | 110673295 | A | * | 1/2020 | ............... G02B 7/09 |
| CN | 110977151 | A | | 4/2020 | |
| CN | 110977159 | A | | 4/2020 | |
| CN | 210254696 | U | | 4/2020 | |
| CN | 111496382 | A | | 8/2020 | |
| CN | 111682728 | A | * | 9/2020 | ............. H02K 16/02 |
| CN | 113020787 | A | | 6/2021 | |
| CN | 113231739 | A | | 8/2021 | |
| JP | 2011011212 | A | | 1/2011 | |
| JP | 2013086129 | A | | 5/2013 | |
| JP | 2018202471 | A | | 12/2018 | |
| WO | 2023284538 | A1 | | 1/2023 | |

* cited by examiner

LENS ASSEMBLY AND LASER WELDING HEAD

CROSS-REFERENCE TO RELATED APPLICATIONS

This is a national stage application filed under 35 U.S.C. 371 based on International Patent Application No. PCT/CN2022/101559, filed Jun. 27, 2022, which claims priority to Chinese Patent Application No. 202110787323.X filed Jul. 13, 2021, the disclosures of which are incorporated herein by reference in their entireties.

TECHNICAL FIELD

The present application relates to the technical field of laser welding, for example, a lens assembly and a laser welding head.

BACKGROUND

Thermal energy converted from light energy of a laser can be kept in an extremely small area; therefore, a laser beam can have a very strong energy at a very small point of action after the laser beam is focused and formed and thus is widely applied in, for example, laser cutting, laser welding and 3D printing devices.

Therefore, when a laser beam is irradiated on metal powder, the heat input by the laser beam can rapidly melt the metal powder so that a laser welding operation or a 3D printing operation can be performed; or when a laser beam is irradiated on a metal material, the metal material is quickly heated to a vaporized level and evaporated to form a hole so that a laser cutting operation can be performed.

Laser beams emitted by a laser emitter are all in Gaussian light energy distribution, that is, energy at the center of a laser beam is high and energy around the center of the laser beam is low; therefore, in a laser welding operation, metal powder can be melted to form a weld joint of a short width, which increases the operation amount of welding. Moreover, in a laser cutting operation of a precision part, the roughness of a laser cut is relatively high, so after the cutting operation, it is necessary to polish the cut to meet the roughness requirements, and thus a polishing process is added.

If a light spot of a laser beam is offset from an optical axis and can rotate around the optical axis in different working situations, the energy of the newly formed light spot is more focused so that the width of a weld joint in laser welding can be increased or the roughness of a cut surface in laser cutting can be lowered, and thereby the operation amount of the laser welding can be reduced or the polishing process after the laser cutting can be reduced; whereas, for the focus of the light spot newly formed after the rotation of the laser beam, the size of the light spot newly formed after the rotation of the laser beam can be regulated only by changing the size of the light spot of the laser beam formed before the rotation. As a result, the regulation is performed in only one manner, and the control precision is reduced.

SUMMARY

A lens assembly and a laser welding head are provided according to the present application, which can address the issues that the size of a light spot newly formed after the rotation of a laser beam is regulated in only one manner and the control precision is poor.

In one aspect of the present application, a lens assembly is provided, which is configured to regulate the size of the focus of a laser beam passing through the lens assembly, and the lens assembly includes a first optical path offset assembly and a second optical path offset assembly, a drive mechanism, an elastic seal ring and a locking mechanism.

The optical path of the first optical path offset assembly and the optical path of the second optical path offset assembly communicate with each other. The first optical path offset assembly and the second optical path offset assembly are each rotatable about the central axis of the lens assembly.

The drive mechanism is configured to drive the first optical path offset assembly to rotate about the central axis.

The elastic seal ring is pressed between the first optical path offset assembly and the second optical path offset assembly and is configured to drive the second optical path offset assembly to rotate together with the first optical path offset assembly when the first optical path offset assembly rotates.

The locking mechanism is pressed against one of the first optical path offset assembly or the second optical path offset assembly to enable the first optical path offset assembly and the second optical path offset assembly to rotate relative to each other.

In another aspect of the present application, a laser welding head is further provided, the laser welding head includes a collimating and focusing assembly, a lens assembly as described above and a detection unit which are connected in sequence, the collimating and focusing assembly is configured to regulate the focus of a laser beam entering the lens assembly, and the detection assembly is configured to detect the size of a light spot of a laser beam output by the lens assembly.

REFERENCE LIST

Figure 1:
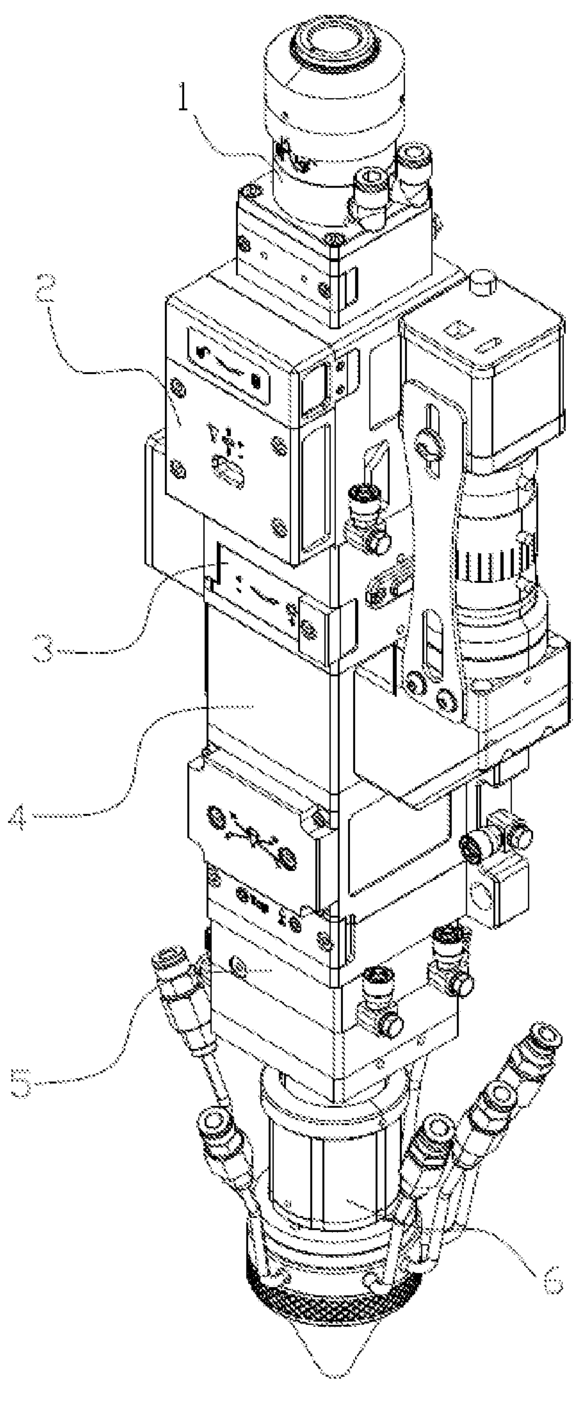
FIG. 1 is a diagram illustrating the structure of a laser welding head according to an embodiment of the present application.
Figure 2:
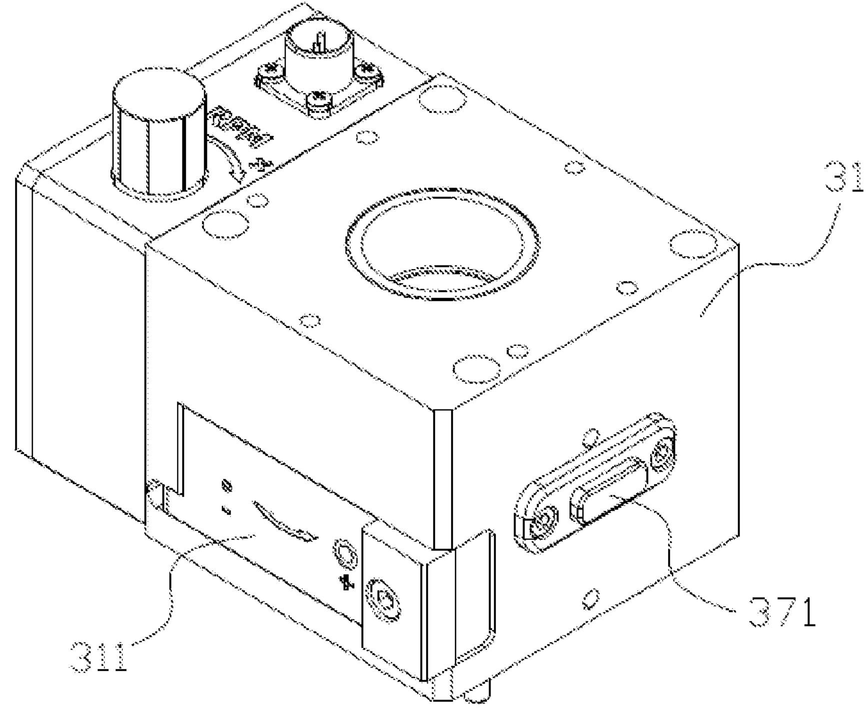
FIG. 2 is a diagram illustrating the structure of a lens assembly in FIG. 1.
Figure 3:
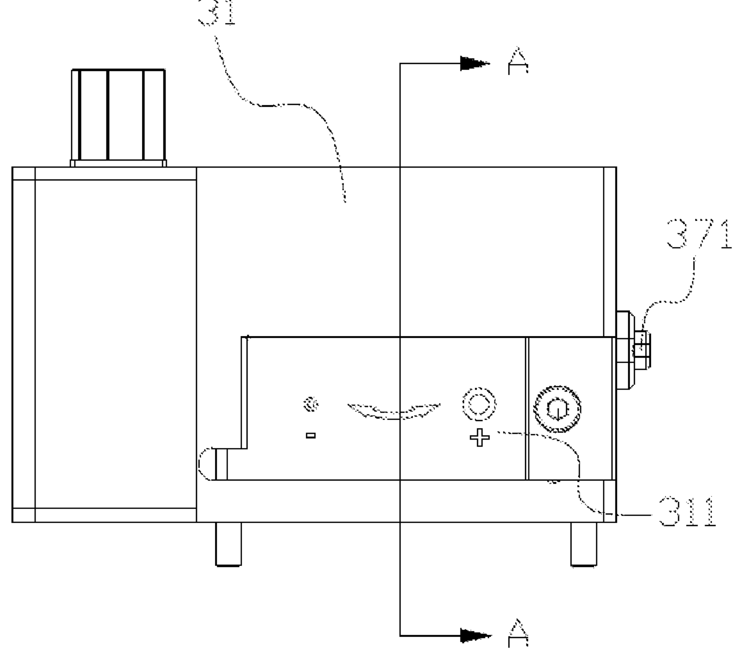
FIG. 3 is a front view of FIG. 2.
Figure 4:
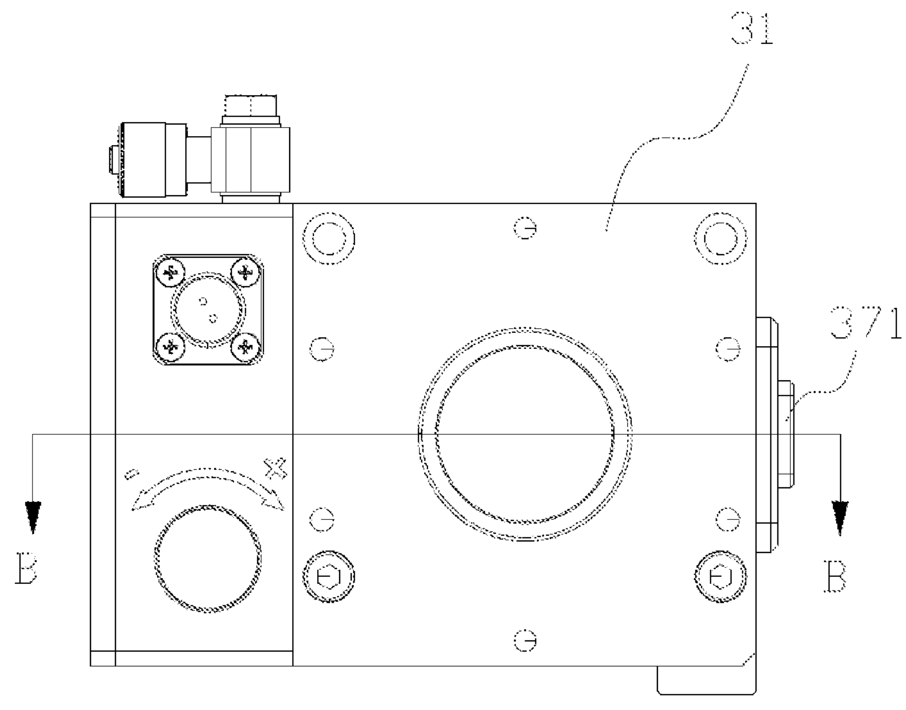
FIG. 4 is a top view of FIG. 2.
Figure 5:
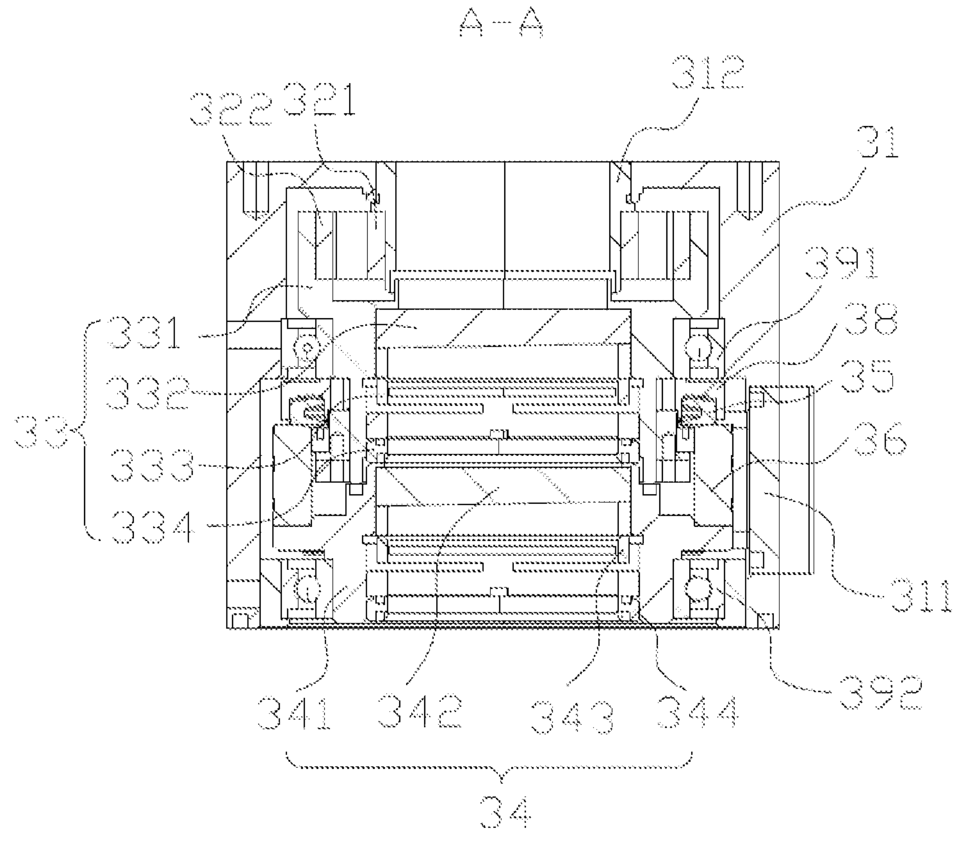
FIG. 5 is a section view along A-A of FIG. 3.
Figure 6:
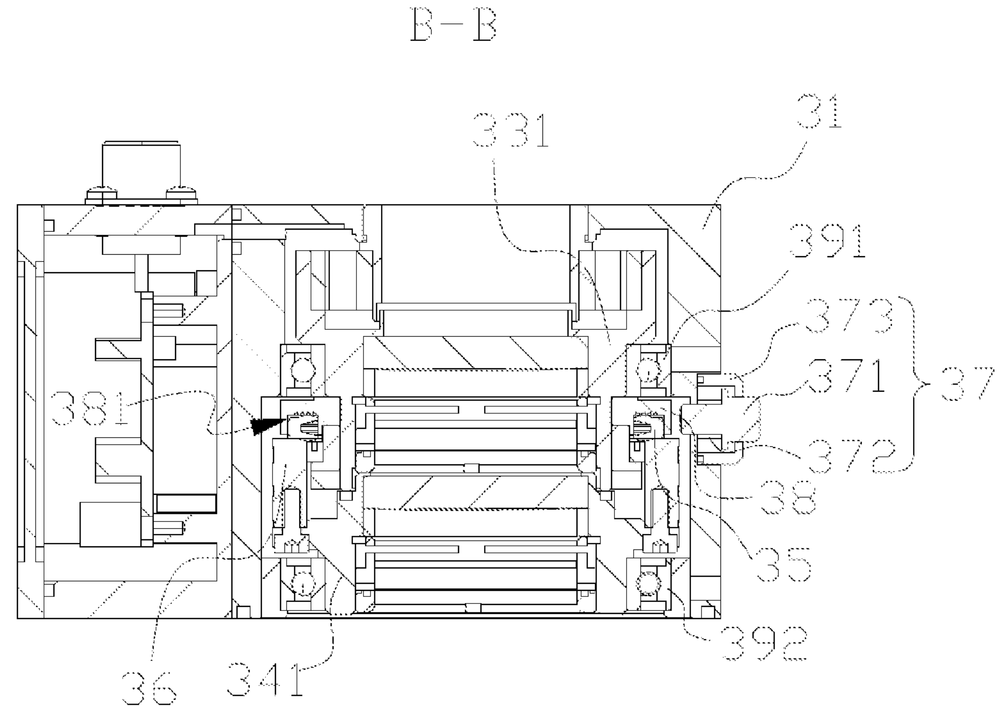
FIG. 6 is a section view along B-B of FIG. 4.

1 optical fiber connector assembly
2 collimating and focusing assembly
3 lens assembly
31 rack
311 sealing compartment cover
312 first positioning member
321 coil
322 magnet
33 first optical path offset assembly
331 first lens barrel
332 first wedge-shaped lens
333 first pressing member
334 second positioning member
34 second optical path offset assembly
341 second lens barrel
342 second wedge-shaped lens

343 second pressing member
344 third positioning member
35 elastic seal ring
36 regulating mechanism
37 locking mechanism
371 pushing body
372 elastic member
373 locking end cap
38 follower
381 annular groove
391 first bearing
392 second bearing
4 detection assembly
5 focusing and centering assembly
6 jetting head assembly
61 first connector
62 second connector
63 nozzle
631 cooling passage
64 inner core
641 knurl
65 space

DETAILED DESCRIPTION

In the description of the present application, unless otherwise expressly specified and limited, the terms "connected to each other", "connected", or "fixed" are to be construed in a broad sense, for example, as permanently connected, detachably connected, or integrated; mechanically connected or electrically connected; directly connected to each other or indirectly connected to each other via an intermediary; or internally connection of two components or interaction between two components. For those of ordinary skill in the art, specific meanings of the preceding terms in the present application may be construed based on specific situations.

In the present application, unless otherwise expressly specified and limited, when a first feature is described as "above" or "below" a second feature, the first feature and the second feature may be in direct contact, or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of this embodiment, the orientational or positional relationships indicated by terms "above", "below", "right" and the like are based on the orientational or positional relationships shown in the drawings, merely for ease of description and simplifying operation, rather than indicating or implying that the referred device or element must have a specific orientation and is constructed and operated in a specific orientation, and thus they are not to be construed as limiting the present application. In addition, the terms "first" and "second" are used only to distinguish between descriptions and have no special meaning.

A laser welding head is provided according to this embodiment, which includes an optical fiber connector assembly 1, a collimating and focusing assembly 2, a lens assembly 3, a focusing and centering assembly 5 and a jetting head assembly 6 which are connected in sequence. The optical fiber connector assembly 1 is connected to a laser generator to transmit a laser beam generated by the laser generator to the laser welding head. The collimating and focusing assembly 2 can regulate the position of the focus of the laser beam in a wide range so as to be able to regulate the size of a light spot of a laser beam at an output end of the jetting head assembly 6.

The laser beams emitted by the laser emitter are all in Gaussian light energy distribution, the energy at the center of the laser beam is high and the energy around the center of the laser beam is low, therefore, in order to enhance the energy of the laser beam and to uniformly distribute the energy of the laser beam, the lens assembly 3 includes a first optical path offset assembly 33 configured to offset the laser beam passing through the lens assembly 3, and a drive mechanism configured to drive the first optical path offset assembly 33 to rotate about the central axis of the lens assembly 3, to allow the energy distribution of a laser beam newly formed by the laser beam passing through the lens assembly 3 after the first optical path offset assembly 33 is rotated about the central axis of the lens assembly 3 to be uniform.

The focusing and centering assembly 5 can regulate the laser beam output by the lens assembly 3 in a direction perpendicular to the optical path to regulate the co-axiality of the output laser beam with the jetting head assembly 6. The jetting head assembly 6 can jet powder at the output end of the jetting head assembly 6, and jet the powder in a molten bath formed by the light spot of the laser beam at the output end of the jetting head assembly 6, so that the molten powder and the molten bath rapidly solidify to form a cladding layer, thereby completing the laser welding operation.

However, the laser welding head can regulate the focus of the laser beam only by the collimating and focusing assembly 2, thereby regulating the size of the light spot of the laser beam at the output end of the jetting head assembly 6, so the regulation is performed in only one manner. In addition, after the rotation of the first optical path offset assembly 33, the amount of change of the collimating and focusing assembly 2 is amplified, thus, the regulation precision is reduced.

In order to address the above issues, as shown in FIG. 1 to FIG. 6, a lens assembly 3 is provided according to this embodiment, and the lens assembly 3 includes a first optical path offset assembly 33, a second optical path offset assembly 34, a drive mechanism, an elastic seal ring 35, and a locking mechanism 37. An optical path of the first optical path offset assembly 33 is in communication with an optical path of the second optical path offset assembly 34, and the first optical path offset assembly 33 and the second optical path offset assembly 34 are rotatable about the central axis of the lens assembly 3. The drive mechanism can drive the first optical path offset assembly 33 to rotate about the central axis of the lens assembly 3, the elastic seal ring 35 is pressed between the first optical path offset assembly 33 and the second optical path offset assembly 34, and when the first optical path offset assembly 33 rotates, the elastic seal ring 35 can drive the second optical path offset assembly 34 to rotate together, to allow the offset laser beam to have energy distributed uniformly after passing through the rotated first optical path offset assembly 33 and second optical path offset assembly 34.

The locking mechanism 37 can abut against and lock one of the first optical path offset assembly 33 or the second optical path offset assembly 34 to enable the first optical path offset assembly 33 and the second optical path offset assembly 34 to rotate relative to each other, such that when the first optical path offset assembly 33 and the second optical path offset assembly 34 rotate relative to each other, an incident angle at which a deviated laser beam enters the second optical path offset assembly 34 can be changed after the laser beam passes through the first optical path offset assembly 33 and is offset from the central axis, to allow the laser beam output by the second optical path offset assembly 34 to be further deviated or be rectified, thereby increasing the means for regulating the size of the light spot of the laser beam output by the lens assembly 3, and the first optical path offset assembly 33 and the second optical path offset assembly 34 return to the initial position only after the relative rotation of the first optical path offset assembly 33 to the second optical path offset assembly 34 reaches one revolution, that is, the relative rotation reaches 360 degrees, so that the regulation range is wider and further the regulation precision can be improved.

In this embodiment, the lens assembly 3 includes a rack 31 provided with a passage for accommodating the first optical path offset assembly 33 and the second optical path offset assembly 34, and a first positioning member 312 is arranged at one end of the passage and is configured to position the first optical path offset assembly 33 in an axial direction of the passage. The drive mechanism includes a coil 321 and a magnet 322, the coil 321 is arranged at the center of the magnet 322 and fixed to the first positioning member 312. The drive mechanism enables the magnet 322 to rotate about the central axis of the passage by energizing the coil 321.

The first optical path offset assembly 33 includes a first lens barrel 331, a first wedge-shaped lens 332, a first pressing member 333 and a second positioning member 334. The first lens barrel 331 is connected to the magnet 322 to be rotatable together with the magnet 322. The first lens barrel 331 is rotatably positioned at a first end of the passage of the rack 31 by means of a first bearing 391, the first wedge-shaped lens 332 is configured to offset the laser beam passing through the first wedge-shaped lens 332, the second positioning member 334 is screwed into the first lens barrel 331, and the first wedge-shaped lens 332 is pressed to be fixed by the second positioning member 334 to a shoulder at one end of the first lens barrel 331. The first pressing member 333 is located between the second positioning member 334 and the first wedge-shaped lens 332, and can be elastically deformed in the axial direction of the central axis to firmly fix the first wedge-shaped lens 332, so as to enable the first wedge-shaped lens 332 to rotate together with the first lens barrel 331.

The second optical path offset assembly 34 includes a second lens barrel 341, a second wedge-shaped lens 342, a second pressing member 343 and a third positioning member 344. The second lens barrel 341 is rotatably positioned at a second end of the passage of the rack 31 through a second bearing 392. The elastic seal ring 35 is pressed between the first lens barrel 331 and the second lens barrel 341, and when the first lens barrel 331 rotates, the elastic seal ring 35 can drive, through a friction force, the second lens barrel 341 to rotate together. The third positioning member 344 is screwed into the second lens barrel 341, and the second wedge-shaped lens 342 is pressed to be fixed by the third positioning member 344 to a shoulder at one end of the second lens barrel 341. The second pressing member 343 is located between the third positioning member 344 and the second wedge-shaped lens 342, and can be elastically deformed in the axial direction of the central axis to firmly fix the second wedge-shaped lens 342, so as to enable the second wedge-shaped lens 342 to rotate together with the second lens barrel 341.

The locking mechanism 37 can be pressed against or become out of contact with the first lens barrel 331, and when the locking mechanism 37 is pressed against the first lens barrel 331, an operator manually rotates the second lens barrel 341 to allow the first lens barrel 331 and the second lens barrel 341 to rotate relative to each other, and then the incident angle at which the laser beam emitted from the first wedge-shaped lens 332 enters the second wedge-shaped lens 342 can be regulated, and then the size of the light spot of the laser beam can be regulated.

In other embodiments, the locking mechanism 37 may further be pressed against or become out of contact with the second lens barrel 341, and the operator may cause the first lens barrel 331 and the second lens barrel 341 to rotate relative to each other by controlling the drive mechanism, which is not specifically limited herein.

In order to facilitate the operator to rotate the second lens barrel 341, in one embodiment, the lens assembly 3 further includes a regulating mechanism 36. The regulating mechanism 36 is sleeved on the second lens barrel 341, an outer side surface of the regulating mechanism 36 is provided with non-slip lines, and the operator fiddles the regulating mechanism 36 to rotate such that the second lens barrel 341 which is not pressed by the locking mechanism 37 is rotated about the central axis of the passage. In this embodiment, the regulating mechanism 36 is a regulating ring, and in other embodiments, the regulating mechanism 36 may further be a worm gear mechanism or other mechanism configured to drive the second lens barrel 341 to rotate, which is not specifically limited herein.

With the above-described structure, since it is necessary to fiddle the regulating mechanism 36 to rotate, the rack 31 must be provided with a through hole through which an object is allowed to extend from the outside into the passage. However, a large amount of soot may be generated during welding, so that the first wedge-shaped lens 332 or the second wedge-shaped lens 342 in the lens assembly 3 may be damaged. In order to ensure the airtightness of the rack 31, a sealing compartment cover 311 is disposed on the side of the regulating mechanism 36 facing the rack 31 and configured to be opened to expose the regulating mechanism 36, so that when to regulate, the sealing compartment cover 311 is opened, and after the regulation finishes, the sealing compartment cover 311 is closed, to allow the passage of the rack 31 to be sealed against the external environment.

In the process of the regulation, the locking mechanism 37 drives the second lens barrel 341 to rotate relative to the first lens barrel 331 through a friction force between the locking mechanism 37 and the first lens barrel 331, in this process, the first lens barrel 331 may be possibly damaged, thus the service life of the first lens barrel 331 may be reduced. In order to address the issue, in an embodiment, the lens assembly 3 further includes a follower 38, and the follower 38 is placed on and fixed to the first lens barrel 331, and the locking mechanism 37 can be pressed against or become out of contact with the follower 38, so that the friction force between the locking mechanism 37 and the follower 38 enables the relative rotation between the second lens barrel 341 and the first lens barrel 331, thereby eliminating the wearing of the first lens barrel 331 by the locking mechanism 37, and improving the service life of the first lens barrel 331.

In this embodiment, the second lens barrel 341 is rotated together with the first lens barrel 331 by the friction force between the elastic seal ring 35 and the first lens barrel 331 and the friction force between the elastic seal ring 35 and the second lens barrel 341, therefore, end faces of the first lens barrel 331 and the second lens barrel 341 which abut against the elastic seal ring 35 may be worn, and further the service lives of the first lens barrel 331 and the second lens barrel 341 may be reduced. In order to address the above issue, in one embodiment, the follower 38 is provided with an annular groove 381, and the elastic seal ring 35 is pressed and limited in the annular groove 381 by the regulating mechanism 36, so that the elastic seal ring 35 can be prevented from wearing the first lens barrel 331 and the second lens barrel 341, thereby improving the service lives of the first lens barrel 331 and the second lens barrel 341. In one embodiment, the wear resistance of the follower 38 and the annular groove 381 can be improved by carburizing or performing other wear resistance-enhancing processes on the end faces of the follower 38 and the regulating mechanism 36 that abut against the elastic seal ring 35 respectively.

In one embodiment, in order to increase the friction force between the elastic seal ring 35 and the follower 38 and the friction force between the elastic seal ring 35 and the regulating mechanism 36, and ensure that the first lens barrel 331 and the second lens barrel 341 can rotate together, non-slip teeth are disposed on the groove bottom of the annular groove 381, and non-slip teeth are disposed on the end face of the regulating mechanism 36 pressing against the elastic seal ring 35, so as to increase the friction force between the elastic seal ring 35 and the follower 38 and the friction force between the elastic seal ring 35 and the regulating mechanism 36, to ensure that the first lens barrel 331 can rotate together with the second lens barrel 341.

A spring seal is a seal with high performance of a U-shaped Teflon having a special spring built-in, with which, a sealing surface is pushed out and slightly pressed against a sealed metal surface by an appropriate spring force plus a system fluid pressure to produce a very excellent sealing effect, and the spring seal has a stable contact pressure, a high pressure resistance and permits a large radial deflection. Therefore, in this embodiment, the elastic seal ring 35 is a spring seal.

In this embodiment, the locking mechanism 37 includes a pushing body 371, an elastic member 372 and a locking end cap 373. The locking end cap 373 is arranged on the rack 31, a first end of the pushing body 371 can be exposed from the locking end cap 373, a second end of the pushing body 371 can protrude into the passage of the rack 31, and when an operator presses the first end of the pushing body 371 exposed from the locking end cap 373, the second end of the pushing body 371 can abut against an outer side wall of the follower 38. The elastic member 372 is arranged between the pushing body 371 and the rack 31, a first end of the elastic member 372 is connected to the pushing body 371, a second end of the elastic member 372 abuts against an outer side wall of the rack 31, and the elastic member 372 can hold the pushing body 371 out of contact with the follower 38.

As shown in FIG. 1, the laser welding head provided in this embodiment further includes a detection assembly 4. The detection assembly 4 is arranged between the lens assembly 3 and the focusing and centering assembly 5, and the detection assembly 4 is configured to detect a laser beam output by the lens assembly 3 so as to be configured to detect the size of a light spot of the laser beam.

Figure 7:
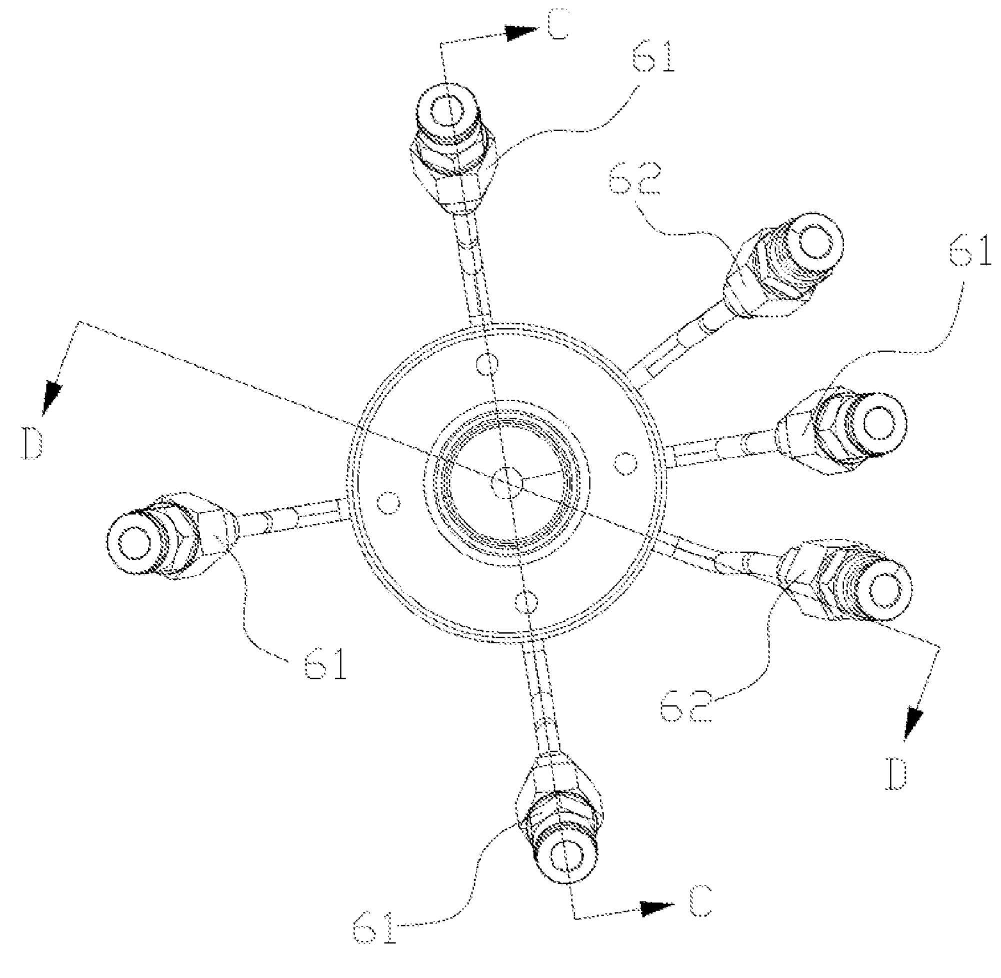
FIG. 7 is a top view of a jetting head assembly of FIG. 1.
Figure 8:
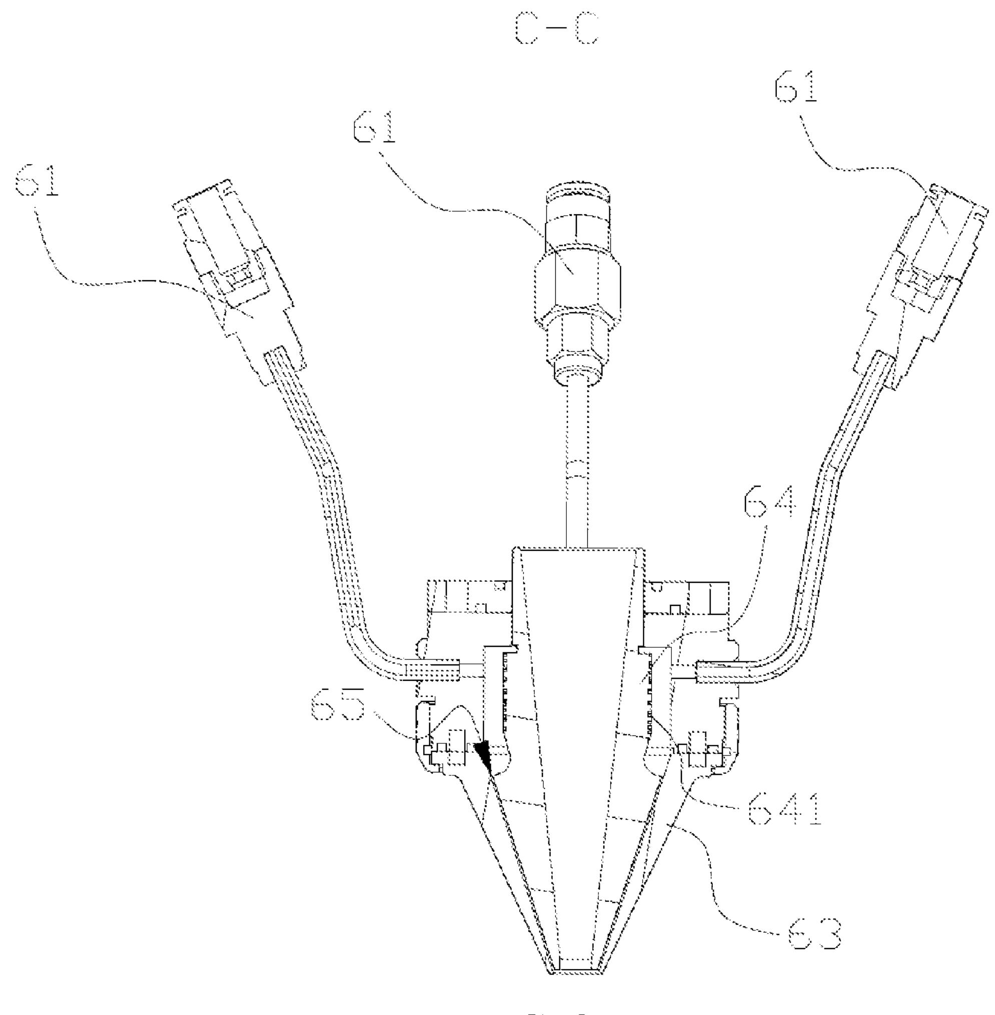
FIG. 8 is a section view along C-C of FIG. 7.
Figure 9:
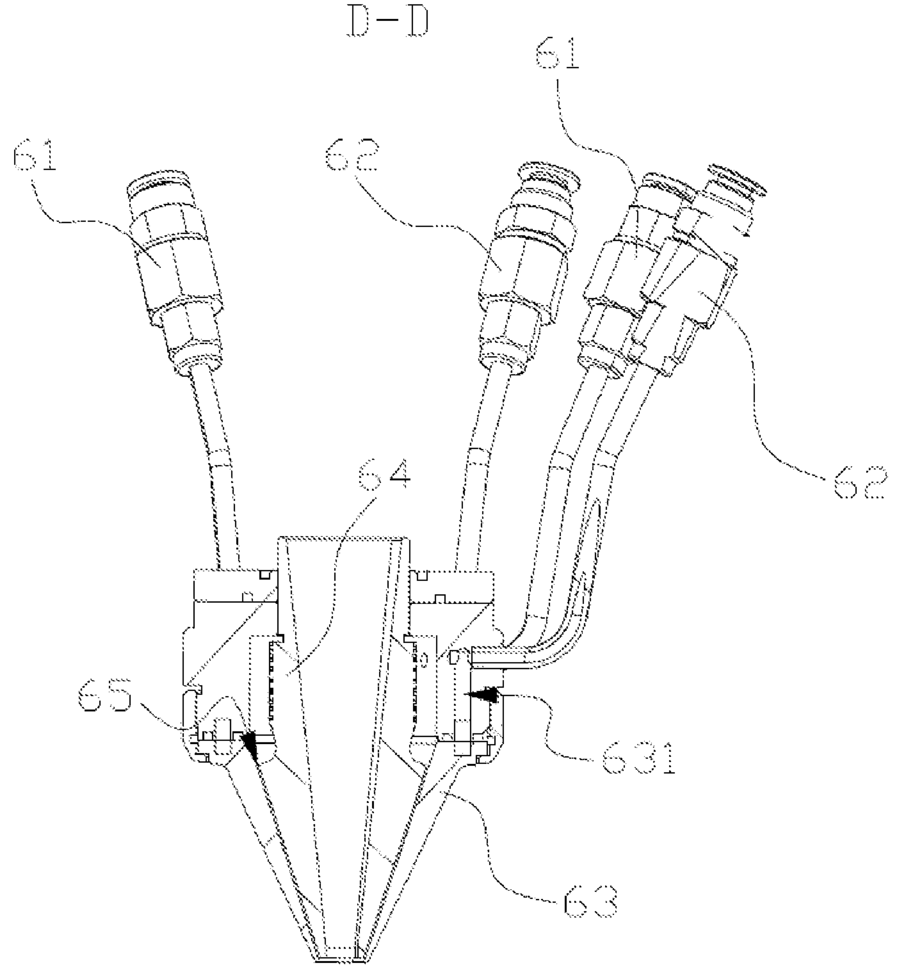
FIG. 9 is a section view along D-D of FIG. 7.

In one embodiment, as shown in FIG. 7 to FIG. 9, the jetting head assembly 6 includes four first connectors 61, two second connectors 62, a nozzle 63 and an inner core 64, the nozzle 63 can be in communication with the four first connectors 61 and the two second connectors 62, respectively. The nozzle 63 is provided with a cavity receiving the inner core 64, and the four first connectors 61 can be in communication with the cavity of the nozzle 63 to enable powder to be jetted into the cavity of the nozzle 63. A space 65 for conveying powder is disposed between an outer side wall of the inner core 64 and an inner side wall of the nozzle 63, and the powder can be jetted to the output end of the nozzle 63 along the space 65 so as to be jetted out. The outer side wall of the inner core 64 and the inner side wall of the nozzle 63 are tapered surfaces, respectively, the inner core 64 is screwed to the nozzle 63, and the operator can rotate the inner core 64 to allow the inner core 64 to be screwed to different positions of the nozzle 63, and thus, the distance between the outer side wall of the inner core 64 and the inner side wall of the nozzle 63 can be regulated, so as to regulate the effect of the powder jetting by the jetting head assembly 6.

A cooling passage 631 is provided in the nozzle 63, and the two second connectors 62 can be in communication with the cooling passage 631. A cooling medium can enter the cooling passage 631 through one second connector 62, and can flow out of the cooling passage 631 through the other second connector 62, thereby, the temperature of the nozzle 63 can be effectively reduced, and the service life of the nozzle 63 can be improved.

In one embodiment, in order to more uniformly disperse the powder jetted, the inner side wall of the nozzle 63 is provided with jetting orifices for jetting out the powder, and the outer side wall of the inner core 64 is provided with a knurl 641 for dispersing the powder.

What is claimed is:

1. A lens assembly configured to regulate a size of a focus of a laser beam, comprising:

a rack, a first optical path offset assembly and a second optical path offset assembly, wherein an optical path of the first optical path offset assembly and an optical path of the second optical path offset assembly communicate with each other, and the first optical path offset assembly and the second optical path offset assembly are each rotatable about a central axis of the lens assembly;

a drive mechanism comprises a coil and a magnet, wherein the coil is arranged at a center of the magnet and fixed to a first positioning member of the rack, the drive mechanism is configured to drive the first optical path offset assembly to rotate about the central axis;

an elastic seal ring pressed between the first optical path offset assembly and the second optical path offset assembly and configured to drive the second optical path offset assembly to rotate together with the first optical path offset assembly when the first optical path offset assembly rotates; and a locking mechanism comprises a pushing body and an elastic member, wherein the pushing body is configured to press against the first optical path offset assembly to enable the first optical path offset assembly and the second optical path offset assembly to rotate relative to each other, and the elastic member is configured to hold the pushing body out of contact with the first optical path offset assembly.

2. The lens assembly according to claim 1, wherein the locking mechanism is configured to abut against and lock the first optical path offset assembly, the lens assembly further comprises a regulating mechanism configured to regulate a position of the second optical path offset assembly relative to the first optical path offset assembly when the locking mechanism abuts against and locks the first optical path offset assembly.

3. The lens assembly according to claim 2, a wherein the rack is configured to seal the first optical path offset assembly, the second optical path offset assembly, the drive mechanism and the elastic seal ring, wherein a sealing compartment cover is disposed on a side of the regulating mechanism facing the rack and configured to be opened to expose the regulating mechanism.

4. The lens assembly according to claim 2, further comprising a follower, wherein the follower is secured to the first optical path offset assembly, and the locking mechanism is configured to press against or be out of contact with the follower; and the follower is provided with an annular groove, and the elastic seal ring is pressed against and defined within the annular groove by the regulating mechanism.

5. The lens assembly according to claim 4, wherein a groove bottom of the annular groove and an end face of the regulating mechanism pressing against the elastic seal ring are each provided with non-slip teeth.

6. The lens assembly according to claim 1, wherein the elastic seal ring is a spring seal.

7. A laser welding head, comprising:

the lens assembly according to claim 1;

a collimating and focusing assembly configured to regulate a focus of a laser beam entering the lens assembly; and a detection assembly configured to detect a size of a light spot of a laser beam output by the lens assembly, wherein the collimating and focusing assembly, the lens assembly, and the detection assembly are connected in sequence.

8. The laser welding head according to claim 7, further comprising a jetting head assembly, wherein the jetting head assembly comprises a nozzle and an inner core, the nozzle is provided with a cavity for accommodating the inner core, a space for conveying powder is disposed between an outer side wall of the inner core and an inner side wall of the nozzle, the outer side wall of the inner core and the inner side wall of the nozzle are each a tapered surface, and the inner core is screwed to the nozzle so that a distance between the outer side wall of the inner core and the inner side wall of the nozzle is regulatable.

9. The laser welding head according to claim 8, wherein the inner side wall of the nozzle is provided with a jetting orifice configured to jet the powder, and the outer side wall of the inner core is provided with a knurl configured to disperse the powder.

10. The lens assembly according to claim 7, wherein the locking mechanism is configured to abut against and lock the first optical path offset assembly, the lens assembly further comprises a regulating mechanism configured to regulate a position of the second optical path offset assembly relative to the first optical path offset assembly when the locking mechanism abuts against and locks the first optical path offset assembly.

11. The lens assembly according to claim 10, wherein the rack is configured to seal the first optical path offset assembly, the second optical path offset assembly, the drive mechanism and the elastic seal ring, wherein a sealing compartment cover is disposed on a side of the regulating mechanism facing the rack and configured to be opened to expose the regulating mechanism.

12. The lens assembly according to claim 10, further comprising a follower, wherein the follower is secured to the first optical path offset assembly, and the locking mechanism is configured to press against or be out of contact with the follower; and the follower is provided with an annular groove, and the elastic seal ring is pressed against and defined within the annular groove by the regulating mechanism.

13. The lens assembly according to claim 12, wherein a groove bottom of the annular groove and an end face of the regulating mechanism pressing against the elastic seal ring are each provided with non-slip teeth.

14. The lens assembly according to claim 7, wherein the elastic seal ring is a spring seal.

* * * * *